UNITED STATES PATENT OFFICE.

ROBERT E. DIVINE, OF CINCINNATI, OHIO.

PRODUCT AND PROCESS OF PRODUCING AN ALKALI-METAL SULFONATE HAVING THE PROPERTIES OF A DETERGENT.

1,301,663.   Specification of Letters Patent.   Patented Apr. 22, 1919.

No Drawing.   Application filed December 8, 1917.   Serial No. 206,303.

*To all whom it may concern:*

Be it known that I, ROBERT E. DIVINE, a citizen of the United States, and residing at Cincinnati, in the county of Hamilton and State of Ohio, have invented a new and useful Product and Process of Producing an Alkali-Metal Sulfonate Having the Properties of a Detergent, of which the following specification is a full disclosure.

My invention relates to a process for producing sodium or potassium sulfonate of sulfonic acid derived from the sludge produced by sulfonating mineral oil, and to the product.

Phases of the present invention are disclosed in my co-pending applications, Serial Nos. 162,456, 162,457, filed April 16, 1917.

By preference, I employ as the source, a sludge resulting from the sulfonation of a mineral oil distillate, such as illuminating oil, treated with $SO_3$ in gaseous form diluted with air, though this specific sludge origin is not a limitation.

The sulfonic acids produced from sludge by my process are readily distinguishable from the sulfonic acids obtained by the Petroff process (United States Patent No. 1,087,888), in that they are more readily soluble in aqueous hydrochloric acid than in ether, while the Petroff sulfonic acids are more readily soluble in ether than in aqueous hydrochloric acid.

Again, my sulfonic acid forms magnesium or calcium sulfonate readily soluble in water, while the Petroff alkali-earth metal sulfonates are relatively insoluble in water.

The present invention is directed to sulfonic bodies water-extracted from sludge, preferably formed by sulfonating a portion of the contents of a mineral oil distillate. These sulfonic bodies have a lower efficiency for splitting fats and oils into glycerin and fatty acids than the sulfonic acids of the Petroff species, are more readily soluble in water, have different soluble characteristics as regards ether and other test solvents, the sulfonate detergents of these sulfonic bodies water-extracted from sludge, are more soluble in water than the detergents of Petroff Patent, #1,196,274, and represent a distinct species having somewhat different and superior detergent properties. Irrespective as to whether the differences are due to the water-extraction from the sludge layer, the herein disclosed products are definitely distinct, and the different characteristics have new and valuable properties not found in the Petroff products.

The invention is not limited to the illustrating proportions stated, nor to the origin or method of producing the sludge, nor to the specific sodium combination. Calcium, barium, magnesium, aluminum also form water-soluble sulfonates, though not nearly so water-soluble as the sodium sulfonate. An alkali metal sulfonate of mineral oil sulfonic acid may be commercially used for saponifying purposes or for producing detergents, or it can be used as a base for the production of sulfonic acids. The sodium and potassium sulfonates being very freely soluble in water, detergents prepared from these sulfonic acids are perfectly adapted to usage in hard water without the disadvantages commonly attending the use of a soap.

I therefore take a sludge produced from sulfonating mineral oil, containing very water-soluble sulfonic acids, and dissolve one hundred parts of sludge into one hundred and fifty to two hundred parts of water, and allow it to stand for eight or twelve hours. Much heat is generated, sulfur-dioxid fumes are evolved, and the free oil will rise to the surface and is decanted. The under layer is a clear, dark-colored liquid. To this liquid, I add sufficient lime to neutralize the solution and a portion of the lime combining with the free sulfuric acid is precipitated and filtered off from the solution of the calcium sulfonate, resulting from the combination of the lime with the sulfonic acid and the accompanying highly colored impurities.

This solution is a clear, red-wine color liquid, to which I add sodium chlorid and calcium chlorid up to about twenty per cent. of the weight of the solution, and the mineral calcium sulfonate separates out of the saline solution, which retains the coloring matters and is recovered by filtration and freed from liquid matter by pressing, or other suitable means. This body may be characterized as a water-soluble mineral oil calcium sulfonate, of light yellow color, plastic, sticky, of distinct aromatic odor, readily soluble in cold water, giving a neutral solution.

Preferably, I employ a selected member of the alkali or earthy metal bases, functioning to neutralize the sulfonic acid solution, and having the property of forming sulfates relatively insoluble in water, and sulfonates readily soluble in water but capable of being salted out of the solution.

In order to make a detergent, I make a suitable water solution of the calcium sulfonate and treat with an equivalent amount of an alkaline salt, say sodium carbonate, capable of decomposing the alkaline earth sulfonate, and the acid component combines with the calcium to form a precipitate with the calcium insoluble in the solution, and the sodium combines with the liberated sulfonic acid to form a detergent which can be separated from the carbonate of lime by filtration, and then reduced to proper consistency. This sodium sulfonate forms a very desirable detergent particularly adapted for usage in hard water.

This sodium sulfonate is very much more soluble in water, than the sodium sulfonate of the Petroff sulfonic acid, (U. S. Patent No. 1,196,274), dissolving in less than an equal volume of water, while it is neutral, very detergent, and has all the properties desirable in a soap capable of use in hard water.

Again, the sodium sulfonate herein disclosed, can be readily distinguished from the Petroff sodium sulfonate by the salting-out test, namely:—

A twenty per cent. water solution of this sludge sodium sulfonate will remain unaffected by the addition of twenty per cent. of sodium chlorid, while a relatively small quantity of sodium chlorid added to a twenty per cent. aqueous solution of the sodium salt of the Petroff sulfonic acid, causes a complete salting out of its solution of the Petroff sodium sulfonate. The superior water solubility of the sludge sodium sulfonate renders it more desirable as a detergent and available for a much wider range of industrial uses.

I have found from several years constant working with the Petroff products, that is, salts of sulfonic acids extracted with oil from sludge and with the salts of the sulfonic acids extracted by water from sludge, that the new detergents herein disclosed, differ from the Petroff detergents, that is, my detergents are definitely more soluble in water, i. e. readily soluble in an equal volume of water, and are not readily salted out of solution, while the Petroff oil-extracted sulfonic acid detergents are readily salted out of solution.

Again, these water-extracted sulfonic acids, of which I form detergents, are much more freely soluble in water than in oil, and as they are so separated, the detergents herein disclosed, are not of the somewhat oily nature of the Petroff oil-extracted sulfonic acids, and hence these new detergents form far more desirable detergents for washing oily substances or materials.

Having described my invention, I claim:—

1. A detergent consisting of an alkali sulfonate of sulfonic bodies water-extracted from the sludge formed by sulfonating a portion of the contents of an oil of petrolic origin, and consisting of a neutral body readily soluble in an equal volume of water.

2. A detergent consisting of an alkali sulfonate of sulfonic bodies water-extracted from the sludge formed by sulfonating a portion of the contents of an oil of petrolic origin, and consisting of a neutral body readily soluble in an equal volume of water, and having the characteristic of not being readily salted out of a concentrated water solution.

3. The herein described process of forming a detergent which consists in mixing a mineral oil sludge with water to dissolve out the sulfonic bodies, separating the solution, combining with a base to form a sulfate insoluble in water and a water soluble sulfonate, filtering off the sulfate, salting the sulfonate out of solution to free from the sludge coloring matter, dissolving the sulfonate, decomposing with carbonate of soda, and separating the precipitated calcium sulfate from the sodium sulfonate.

In witness whereof, I hereunto subscribe my name, as attested by the two subscribing witnesses.

ROBERT E. DIVINE.

Witnesses:
MILDRED SMITH,
L. BECK.